United States Patent
Slayter et al.

(10) Patent No.: US 10,247,105 B2
(45) Date of Patent: Apr. 2, 2019

(54) AIR TURBINE STARTER WITH LUBRICATION VALVE

(71) Applicant: Hamilton Sundstrand Corporation, Charlotte, NC (US)

(72) Inventors: Matthew A. Slayter, Rockford, IL (US); Jeff A. Brown, Cherry Valley, IL (US); Benjamin T. Harder, DeKalb, IL (US)

(73) Assignee: Hamilton Sundstand Corporation, Charlotte, NC (US)

( * ) Notice: Subject to any disclaimer, the term of this patent is extended or adjusted under 35 U.S.C. 154(b) by 515 days.

(21) Appl. No.: 14/991,187

(22) Filed: Jan. 8, 2016

(65) Prior Publication Data

US 2017/0198641 A1 Jul. 13, 2017

(51) Int. Cl.
*F16K 17/30* (2006.01)
*F02C 7/277* (2006.01)

(52) U.S. Cl.
CPC .............. *F02C 7/277* (2013.01); *F16K 17/30* (2013.01); *F05D 2260/85* (2013.01); *F05D 2260/98* (2013.01); *Y10T 137/7785* (2015.04)

(58) Field of Classification Search
CPC ........... Y10T 137/7785; Y10T 137/729; F16N 23/00; F16N 25/02; F16K 17/20; F02C 7/277

USPC .......................................................... 137/498
See application file for complete search history.

(56) References Cited

U.S. PATENT DOCUMENTS

| | | | |
|---|---|---|---|
| 6,443,180 B1 * | 9/2002 | Samuelson | F16K 17/30 137/460 |
| 7,644,726 B1 * | 1/2010 | Achterman | F16K 1/12 137/498 |
| 8,910,463 B2 | 12/2014 | Telakowski | |
| 9,255,590 B2 * | 2/2016 | Schuller | F15B 21/044 |
| 2015/0082805 A1 | 3/2015 | Zeiner et al. | |
| 2015/0292414 A1 | 10/2015 | Geck et al. | |

* cited by examiner

*Primary Examiner* — Todd E Manahan
*Assistant Examiner* — Rene Ford
(74) *Attorney, Agent, or Firm* — Locke Lord LLP; Scott D. Wofsy; Joshua L. Jones

(57) ABSTRACT

An air turbine starter includes a transfer tube having a lubrication inlet and a lubrication outlet configured to allow fluid to flow therethrough. A valve is positioned within the transfer tube including a spring. The spring is configured to selectively allow fluid flow within the transfer tube based on fluid pressure differential across the valve. The spring can have three positions: a first position configured to prevent flow within the transfer tube, an intermediate position configured to allow free flow of fluid within the transfer tube, and a compressed positioned to prevent flow to the lubrication outlet.

12 Claims, 2 Drawing Sheets

AIR TURBINE STARTER WITH LUBRICATION VALVE

BACKGROUND OF THE INVENTION

1. Field of the Invention

The present disclosure relates to air turbine starters, and more particularly to air turbine starters with a valve to regulate fluid flow.

2. Description of Related Art

An air turbine starter ("ATS") is a device used to start a turbine engine, such as a gas turbine jet engine. Air turbine starters are typically mounted to the jet engine through a gearbox between the starter housing and the gearbox housing. The transmission transfers power from the starter to start the jet engine. The transmission may also transmit power from the jet engine to other components linked to the transmission.

Some air turbine starters are lubricated at least in part which allows free transfer of lubricating oil and air between the gearbox and starter. Oil ports are fluid communication with internal passages within the starter housing for distribution of the lubricating oil it has acquired. The air passage prevents a vapor lock that would prevent oil transfer. The oil port is located such that it acts as a sump passage or oil return passage and allows free flow of the oil between the starter and the gearbox. Typically oil flow to air turbine starters is wasted when oil flows at high pressure when the engine is already started or at low pressure during actual start.

Such conventional methods and systems have generally been considered satisfactory for their intended purpose. However, there is still a need in the art for improved an air turbine starters. The present disclosure provides a solution for this need.

SUMMARY OF THE INVENTION

An air turbine starter includes a transfer tube having a lubrication inlet and a lubrication outlet configured to allow fluid to flow therethrough. A valve is positioned within the transfer tube including a spring. The spring is configured to selectively allow fluid flow within the transfer tube based on fluid pressure differential across the valve.

The spring can have three positions: a first position configured to prevent flow within the transfer tube, an intermediate position configured to allow free flow of fluid within the transfer tube, and a compressed positioned to prevent flow to the lubrication outlet. The spring can be in the first position when zero pressure differential is measured across the valve. The spring can be in the intermediate position when an intermediate pressure differential is measured across the valve. The intermediate pressure differential can be greater than zero pressure. The spring can be in the compressed position when a flight pressure differential is measured across the valve. The flight pressure can be greater than the intermediate pressure.

The valve can further include a first set of radial holes positioned near the lubrication inlet and a second set of radial holes near the lubrication outlet. The spring in the first position can be configured to prevent flow through the first set of radial holes. The spring in the intermediate position can be configured to allow fluid to flow through the first set of radial holes and enter the second set of radial holes thereby allowing fluid to reach the lubrication outlet. The fluid can flow through the first set of radial holes to an annulus surrounding the valve and can enter the second set of radial holes to exit the transfer tube through the lubrication outlet. The spring in the compressed position can be configured to seal the valve and prevent fluid to flow through the second set of radial holes. The fluid can flow through the first set of radial holes to an annulus surrounding the valve and is prevented from entering the second set of radial holes.

The transfer tube can include an orifice near the lubrication outlet configured to meter the flow from the transfer tube to a sump. The valve can include a poppet valve.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
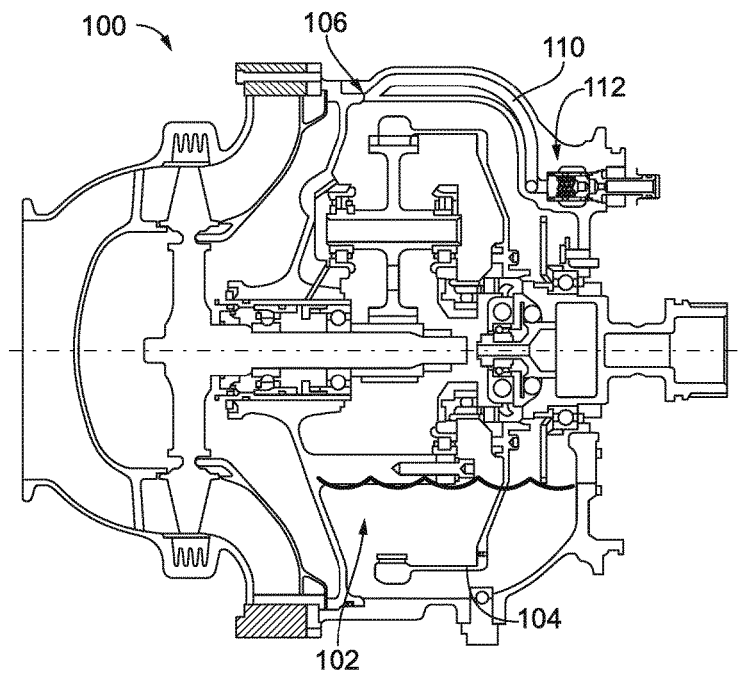
FIG. 1 is a cross-sectional schematic view of an exemplary embodiment of a gas turbine, showing an air turbine starter (ATS) constructed in accordance with the present disclosure, showing a valve within a transfer tube of the ATS.

Reference will now be made to the drawings wherein like reference numerals identify similar structural features or aspects of the subject disclosure. For purposes of explanation and illustration, and not limitation, a partial view of an exemplary embodiment of an air turbine starter in accordance with the disclosure is shown in FIG. 1 and is designated generally by reference character 100. Other embodiments of the air turbine starter in accordance with the disclosure, or aspects thereof, are provided in FIGS. 2-4, as will be described.

With reference to FIG. 1, an air turbine starter (ATS) 100 constructed in accordance with the present disclosure is shown. The ATS 100 can be typically mounted to a jet engine through a gearbox between a starter housing and a gearbox housing. The ATS includes a lubrication system which delivers lubricant, for example, oil, to rotating elements of the turbine starter. The lubricant is delivered to the ATS through a transfer tube 110. The starter lubricant pools in a lubricant sump 102 inside the turbine starter where the rotating elements, for example, a gear assembly 104, pick up an amount of starter lubricant while passing through the lubricant sump 102. The ATS 100 can include various additional components, which will not be described in detail to avoid unnecessarily obscuring the present disclosure.

In typical ATSs lubricant is wasted since the lubricant flows freely when the engine is operating at high pressure and barely flows during actual start-up when operating at low pressure. The present disclosure provides a valve 112 within the ATS 100 to regulate the lubricant flow and prevent leakage. The valve 112, for example, a poppet valve 130 is included in the transfer tube 110 to regulate lubricant flow based on fluid pressure on the gearbox circuit. More specifically, the transfer tube 110 has a lubrication inlet 114 and a lubrication outlet 116 (shown in FIG. 2) configured to allow fluid to flow therethrough. The valve 112 is positioned within the transfer tube and includes a spring 120. The spring 120 is configured to selectively allow fluid to flow within the transfer tube 110 based on fluid pressure differential.

Figure 2:
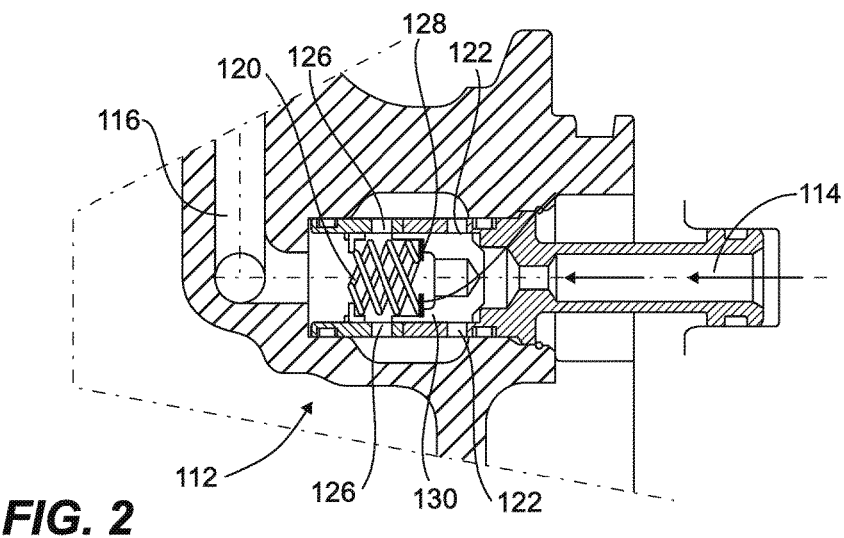
FIG. 2 is a cross-sectional schematic view of the transfer tube of FIG. 1, showing the valve in a first position.
Figure 3:
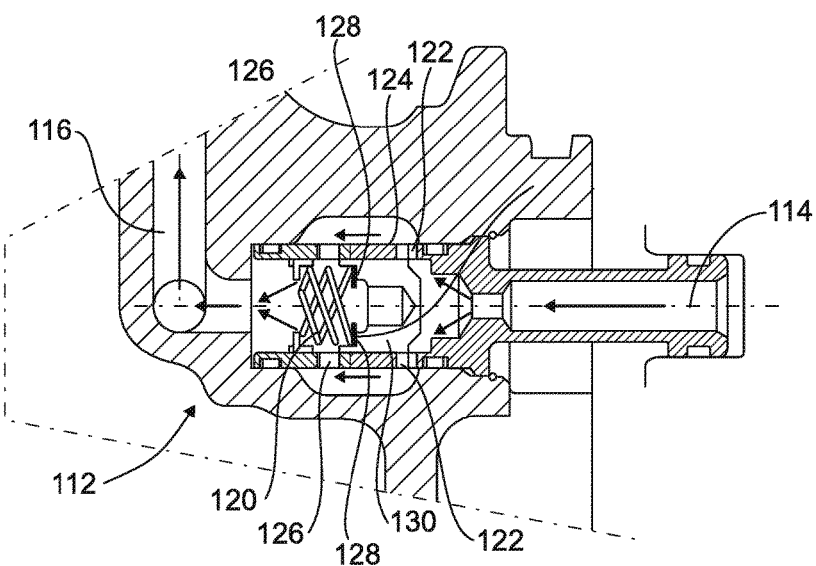
FIG. 3 is a cross-sectional schematic view of the transfer tube of FIG. 1, showing the valve in an intermediate position.
Figure 4:
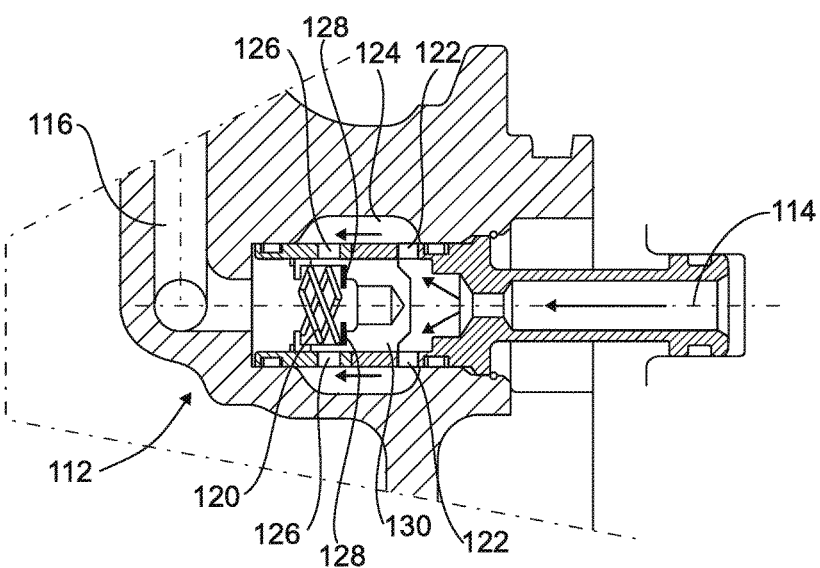
FIG. 4 is a cross-sectional schematic view of the transfer tube of FIG. 1, showing the valve in a compressed position.

With reference to FIGS. 2-4, the transfer tube 110 is shown with the valve 112 positioned therein, showing the spring 120 having three positions (shown in each respective figure) based on lubricant pressure. FIG. 2 illustrates a first position configured to prevent flow within the transfer tube 110. The spring is typically in the first position when zero pressure is exerted on the valve (i.e. the engine is static/turned off). The spring 120 is in the first position when the ATS is static and there is zero pressure on the valve 112. In this position the valve 112 remains fully sealed. A first set of radial holes 122 positioned proximate the lubrication inlet 114 is blocked and therefore lubricant is prevented from flowing within the transfer tube 110. The lubricant levels within the ATS 100 are maintained and there is little to no flow back from the gearbox circuit into the starter housing and spilling into the gear assembly.

With reference to FIG. 3, the spring 120 is an intermediate position when an intermediate pressure is exerted on the lubricant. The intermediate pressure is generally low pressure that occurs during start-up of the engine. In this position, the turbine engine has started and rotation of gears/shafts of the engine requires lubrication. The valve 112 begins to open with the spring 120 moving from the first position to the intermediate position. As the valve 112 opens, lubricant flows through the first set of radial holes 122. The lubricant flows through an annulus 124 surrounding the valve 112 and into a second set of radial holes 126 proximate the lubrication outlet 116 to exit the transfer tube 110 through the lubrication outlet 116. As the lubricant exits the second set of radial holes 126 the lubricant reaches the lubricant sump 102 through an orifice 106 which lubricates the bearings and gears while also aiding in cooling the ATS 100.

With reference to FIG. 4, when flight pressure is exerted on the gearbox circuit, for example during flight, the spring 120 is in the compressed positioned and fully compressed within the valve 112. Flight pressure is greater than intermediate pressure. In this mode, the valve 112 is now fully sealed and the second set of radial holes 126 is blocked. Lubricant may still flow through the first set of radial holes 124 but is prevented from entering the second set of radial holes 126 and exiting through the lubrication outlet 116.

As shown and described the valve 112 and spring 120 operate at three intervals based on pressure within the engine. A shim 128 is located between the spring 120 and the valve 112. The shimming (various thicknesses of spacers) allows the spring 120 which has high variability from piece to piece to be dialed in to match the correct pressure for each of the three intervals. When the spring 120 is in the first position at zero pressure no flow of lubricant is present in the transfer tube. At an intermediate pressure (i.e. greater than zero pressure but less than flight pressure) the spring 120 is in an intermediate position and free flow of lubricant is present in the transfer tube 110. With the spring 120 in a compressed position, which occurs at flight pressure, lubricant enters the transfer tube 110 but is prevented from exiting. It is envisioned that the valve 112 shown and described herein consists of simple components and is intended to be assembled and tested as a single unit in conjunction with current ATSs. In addition, small leakages can be created and managed by closely controlling the fit of the spring 120 diameter within the valve 112 and the valve 112 within the transfer tube 110.

The methods and systems of the present disclosure, as described above and shown in the drawings, provide for a lubrication valve with superior properties including three positions to regulate lubricant flow. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An Air Turbine Starter (ATS), comprising:
   a lubrication sump and rotating elements within a casing of the ATS;
   a transfer tube extending through the casing, the transfer tube having a lubrication inlet connected to a lubrication source and a lubrication outlet configured to allow fluid to flow through the casing and into the lubrication sump; and
   a valve positioned within the transfer tube including a spring, wherein the spring is configured to selectively allow fluid flow within the transfer tube based on fluid pressure differential across the valve,
   wherein the spring has three positions: an uncompressed first position configured to prevent flow within the transfer tube, an intermediate position configured to allow free flow of fluid within the transfer tube, and a fully compressed position to prevent flow to the lubrication outlet.

2. The ATS of claim 1, wherein the spring is in the first position when zero pressure differential is measured across the valve.

3. The ATS of claim 2, wherein the spring is in the intermediate position when an intermediate pressure differential is measured across the valve, the intermediate pressure being greater than zero pressure and less than a flight pressure.

4. The ATS of claim 3, wherein the spring is in the fully compressed position when a flight pressure differential is measured across the valve, the flight pressure being greater than an intermediate pressure.

5. The ATS of claim 1, further comprising a first set of radial holes positioned proximate the lubrication inlet and a second set of radial holes proximate the lubrication outlet.

6. The ATS of claim 5, wherein the spring in the first position is configured to prevent flow through the first set of radial holes.

7. The ATS of claim 5, wherein the spring in the intermediate position is configured to allow fluid to flow through the first set of radial holes and enter the second set of radial holes thereby allowing fluid to reach the lubrication outlet.

8. The ATS of claim 7, wherein the fluid flows through the first set of radial holes to an annulus surrounding the valve and enters the second set of radial holes to exit the transfer tube through the lubrication outlet.

9. The ATS of claim 5, wherein the spring in the fully compressed position is configured to seal the valve and prevent fluid to flow through the second set of radial holes.

10. The ATS of claim 9, wherein the fluid flows through the first set of radial holes to an annulus surrounding the valve and is prevented from entering the second set of radial holes.

11. The ATS of claim 9, further comprising an orifice near the lubrication outlet configured to meter the flow from the transfer tube to a sump.

12. The ATS of claim 1, wherein the valve includes a poppet valve.

* * * * *